United States Patent [19]

Kita

[11] 4,455,878
[45] Jun. 26, 1984

[54] FLUID FLOW RATE MEASURING APPARATUS

[75] Inventor: Toru Kita, Yokosuka, Japan

[73] Assignee: Nissan Motor Co., Ltd., Yokohama, Japan

[21] Appl. No.: 433,858

[22] Filed: Oct. 12, 1982

[30] Foreign Application Priority Data

Dec. 17, 1981 [JP] Japan .......................... 56-187056[U]

[51] Int. Cl.³ ............................ G01F 1/32; G01F 1/68
[52] U.S. Cl. ..................................... 73/861.22; 73/204
[58] Field of Search ................. 73/861.22, 204, 118 A

[56] References Cited

U.S. PATENT DOCUMENTS 4,299,125 11/1981 Romann et al. ...................... 73/204
4,320,650 3/1982 Kita ............................. 73/861.22 X
4,338,814 7/1982 Romann ............................ 73/118 A

FOREIGN PATENT DOCUMENTS 19206 11/1980 European Pat. Off. .
55-49544 4/1980 Japan ............................... 73/118 A
2073426 10/1981 United Kingdom .

OTHER PUBLICATIONS

Adler–"Thin Film of Nickel Measures Air Speed", Electronic Energ., vol. 47, No. 572, pp. 10–11, Oct. 1975.

Primary Examiner—Charles A. Ruehl
Attorney, Agent, or Firm—Schwartz, Jeffery, Schwaab, Mack, Blumenthal & Koch

[57] ABSTRACT

A Karman vortex detecting type fluid flow rate measuring apparatus which comprises a vortex generator in a conduit, two spaced terminal rod members fixed to the conduit and having respective straight sections which extend along the conduit; a vortex detector supported by the terminal rod members by having both ends thereof soldered or welded to the straight sections of the terminal rod members, respectively, two connecting wires connecting the detector with the corresponding terminal rod members, and means for resiliently holding the straight sections of the terminal rod members, the ends of the detector and the connecting wires relative to the conduit.

9 Claims, 7 Drawing Figures

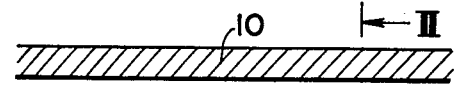
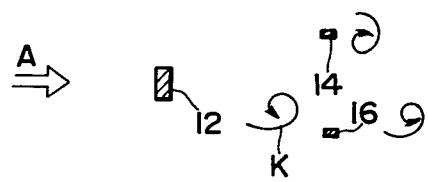
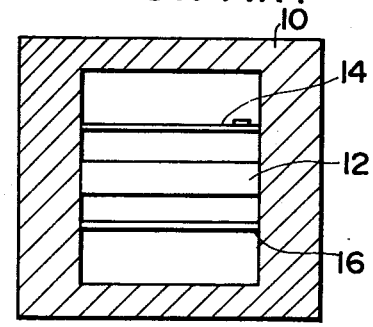
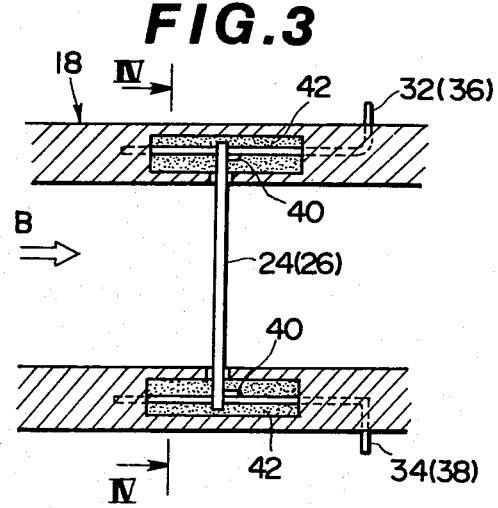

FLUID FLOW RATE MEASURING APPARATUS

BACKGROUND OF THE INVENTION

1. Field of the Invention

The present invention relates in general to a flow rate measuring apparatus and more particularly to an apparatus to which the theory "Karman vortex street" is practically applied.

2. Description of the Prior Art

It is known that, under certain conditions, a "Karman vortex street" is shed in the wake of a bluff body when a flow of fluid is perpendicular to the body. The shedding of vortexes occurs periodically first from one side of the body and then from the other in accordance with the velocity of the flow. Thus, by detecting or counting the number of the vortexes created by the body in a unit time, the flow rate of the fluid can be measured. For this purpose, an electrically operated Karman vortex detector (or detectors) is employed, which is disposed in a fluid conduit downstream of the vortex generating body. However, some of the flow rate measuring apparatus of this type have a weak point in stably and lastingly supporting the detector in the fluid conduit in which a fluid to be measured flows, as will be understood hereinafter.

SUMMARY OF THE INVENTION

According to the present invention, there is provided a fluid flow rate measuring apparatus which comprises a conduit in which a fluid to be measured flows in a given direction, a vortex generator arranged in the conduit to produce vortexes upon flowing of the fluid; two terminal rod members of electrically conductive resilient material, each being fixed to laterally opposed side wall sections of the conduit downstream of the vortex generator, each terminal rod member having a straight section which extends along the conduit; a vortex detector for detecting the vortexes produced by the vortex generator, the detector being supported by said terminal rod members by having both ends thereof electrically and mechanically connected to the straight sections of the terminal rod members, respectively; two connecting wires, each having one end connected to the detector and the other end connected to the straight section of one of the terminal rod members to achieve an additional electrical connection between the detector and the corresponding terminal rod member in addition to the direct connection therebetween; and means for resiliently supporting the straight sections of the terminal rod members, the ends of the detector and the connecting wires relative to the conduit.

BRIEF DESCRIPTION OF THE DRAWINGS

Objects and advantage of the present invention will become clear from the following description when taken in conjunction with the accompanying drawings, in which:

FIG. 1 is a longitudinally sectioned view of a conventional fluid flow rate measuring apparatus to which the theory "Karman vortex street" is practically applied;

FIG. 2 is a laterally sectioned view taken along the line II—II of FIG. 1;

FIG. 3 is a partial, longitudinally sectioned view of a fluid flow rate measuring apparatus according to the present invention;

DESCRIPTION OF THE INVENTION

Prior to describing the invention, one of the conventional Karman vortex fluid flow rate measuring apparatus will be outlined with reference to FIGS. 1 and 2 in order to clarify the invention.

Referring to FIGS. 1 and 2, there is shown a conventional fluid flow rate measuring apparatus to which the theory "Karman vortex street" is practically applied. The apparatus comprises a conduit 10 in which a fluid, such as air, to be measured flows in the direction of arrow A. Within the conduit 10 are disposed a vortex generator 12 lying to be perpendicular to the fluid flow, and a pair of vortex detectors 14 and 16 located downstream of the vortex generator 12. Each detector is constructed of, for example, an insulating plate lined with a metal film. The metal films on the insulating plates are connected through lead wires (not shown) to a known control circuit.

In operation, the detectors 14 and 16, that is, the metal films on the insulating plates are applied with current to be heated. Upon flowing of the fluid in the conduit 10, the metal films thus kept heated are cooled in accordance with the shedding of vortexes K created by the vortex generator 12. The cooling of the metal films changes or lowers the electric resistance of them, resulting in a change or drop of voltage applied to these metal films. The voltage change thus appearing is treated by the known control circuit to prepare the practically usable information signals representative of the flow rate of the fluid in the conduit 10.

However, in the apparatus of the above-mentioned type, the supporting of the detectors 14 and 16 in the conduit 10 has been achieved by directly fixing both ends of them to the conduit 10 as may be understood from FIG. 2. However, this supporting manner is easily affected by thermal stress created in the detectors and thus may cause a peel-off phenomenon of the connected sections of the detectors to the conduit. In fact, when a certain temperature difference appears between the detectors 14 and 16 and the conduit 10 due to, for example, the heat generation of the detector by itself and/or the flowing of hot or cold fluid in the conduit 10, there inevitably occurs a thermal expansion difference between the detector 14 or 16 and the conduit 10 because of the different thermal expansibilities of the materials which form the detectors 14 and 16 and the conduit 10. Thus, there is a high possibility of damaging the joint portions between the detectors and the conduit. Furthermore, the expansion difference now mentioned may cause disconnection of the lead wires from the corresponding detectors.

Therefore, to eliminate the above-mentioned drawbacks is an essential object of the present invention.

Figure 4:
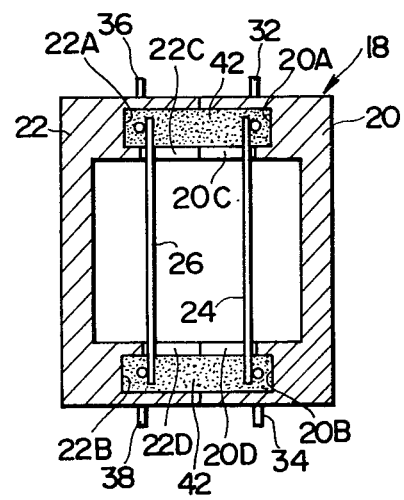
FIG. 4 is a laterally sectioned view taken along the line IV—IV of FIG. 3.
Figure 5:
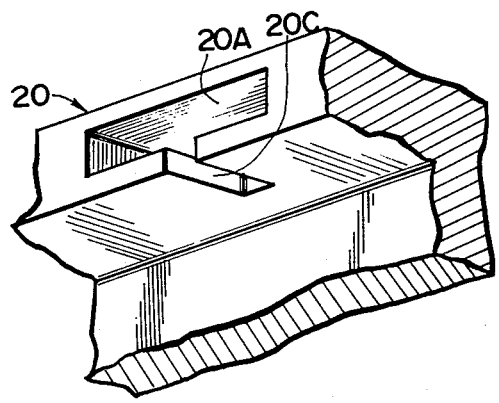
FIG. 5 is a partial, perspective view of a channel member which is a part of a conduit employed in the invention.

Referring to FIGS. 3 and 4, there is shown a fluid flow rate measuring apparatus according to the present invention. The apparatus comprises a conduit 18 in which a fluid to be measured flows in the direction of arrow B. (see FIG. 3). The conduit 18 is constructed of an insulating material such as a plastics and, as is seen from FIG. 4, consists of two identical channel members 20 and 22. These channel members 20 and 22 are combined by joining the tops of their corresponding side wall sections to provide therewithin an enclosed rectangular passage for the fluid. For the reason which will become clear as the description proceeds, the channel members 20 and 22 are formed at their side wall sections with respective rectangular chambers 20A, 20B, 22A and 22B each extending from the top of the corresponding side wall section to the middle portion of the same as will be seen from FIG. 5. Furthermore, as is seen from this drawing, the side wall sections of each channel member 20 or 22 are formed with respective slits 20C, 20D, 22C and 22D through which the interior of each rectangular chamber 20A, 20B, 22A or 22B is communicated or merged with that of the conduit 18. Upon coupling of the channel members 20 and 22, the rectangular chambers 20A and 20B and the slits 20C and 20D of one channel member 20 are respectively mated or merged with those 22A and 22B and those 22C and 22D of the other channel member 22, as is understood from FIG. 4.

Within the conduit 18, there are disposed a vortex generator (not shown), and a pair of vortex detectors 24 and 26 which are located downstream of the vortex generator, similar to the case of the conventional apparatus. Each of the detectors 24 and 26 comprises a base plate 28 (see FIG. 6) of an insulating heat resisting material, such as silica glass, ceramic, or the like. The base plate 28 is lined or coated with a metal film 30 of platinum, tangusten, aluminium or the like by, for example, an evaporation lining method.

In the present invention, the following measure is employed for achieving not only stable and lasting supporting of the detectors 24 and 26 in the conduit 18 but also high lasting connection of the detectors to the corresponding lead wires.

As is seen from FIGS. 3 and 4, terminal rod members 32, 34, 36 and 38 of electrically conductive resilient material are embedded in the side wall sections of the channel members 20 and 22, extending longitudinally therealong and exposing their major or straight sections to the corresponding rectangular chambers 20A, 20B, 22A and 22B. These terminal rod members 32, 34, 36 and 38 are set in the associated portions during the moulding of the channel members 20 and 22. As is seen from FIG. 3, one end of each terminal rod member 32, 34, 36 or 38 is bent at generally right angles to be projected outwardly from the conduit 18. Although not shown in the drawings, lead wires extending from a known control circuit are connected to the projected end portions of the terminal rod members.

Figure 6:
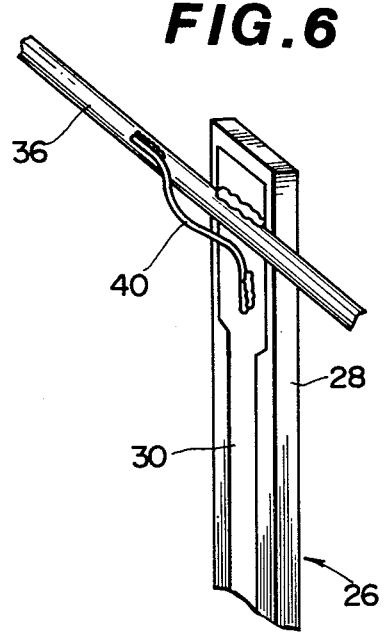
FIG. 6 is a perspective, enlarged view of an essential portion of the apparatus of the present invention.

The detectors 24 and 26 having the afore-mentioned construction are disposed in the conduit 18 to be perpendicular to the fluid flow, projecting at their both end portions through the slits 20C, 20D, 22C and 22D into the rectangular chambers 20A, 20B, 22A and 22B. The ends of the detectors 24 and 26 are in engagement with the terminal rod members 32, 34, 36 and 38. As is seen from FIG. 6, each detector, more particularly, the metal film 30 of each detector is soldered or welded to the corresponding terminal rod member 36 in a manner to achieve a tight holding or supporting of the detector 24 or 26 as well as an electric connection therebetween. For achieving more reliable electric connection between each terminal rod member and the corresponding detector, connecting wires 40 are employed which span therebetween, as shown by FIG. 6.

The mated chambers 20A and 22A and the other mated chambers 20B and 22B in which the ends of the detectors 24 and 26 are located to be engaged with the terminal rod members 32 and 36, and 34 and 38 are packed with insulating resilient materials 42, such as heat resisting rubber.

Since the operation of the apparatus of the present invention is substantially the same as the above-mentioned conventional apparatus, the description of it will be omitted.

With the construction of the apparatus according to the invention, the following advantages are given.

First, even when the detector 24 or 26 is subjected to a thermal expansion or contraction due to the heat generation of itself and/or hot or cold fluid flowing through the conduit 18 thereby inducing a change in length of the detector, the change induces merely a slight curving of the associated terminal rod members, that is, the straight sections of them positioned in the rectangular chambers. In fact, the terminal rod members act as a length compensator. Thus, the connection of the detector 24 or 26 with the associated terminal rod members 32 and 34 or 36 and 38 is assured.

Second, even if the direct connection between the detector 24 or 26 and the associated terminal rod members 32 and 34 or 36 and 38 is damaged due to an unexpected great stress applied thereto, the electric connection between the two members thus disconnected is assuredly kept by the connection wire 40.

Third, packing the rectangular chambers 20A, 20B, 22A and 22B with the heat insulating resilient materials induces that the mutually connected portions of the detectors, the terminal rod members and the connecting wires are protected from not only heat in the conduit 18 but also violent vibration. Furthermore, the presence of such packing material in the rectangular chambers does not induce a severe displacement of the detectors even when the direct connection between the detectors and the terminal rod members is broken. Thus, the electrical connection therebetween is kept assuredly by the connecting wires 40.

Figure 7:
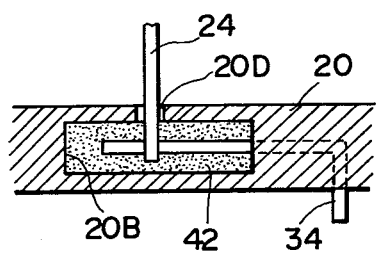
FIG. 7 is a partial and sectioned view of a modification of the apparatus of the present invention.

Referring to FIG. 7, there is shown a modification of the apparatus described hereinabove. In this modification, one end of the straight section of each terminal rod member 32, 34, 36 or 38 terminates at a position spaced from the wall of the corresponding rectangular chamber. With this construction, the resiliency of the terminal rod members is more improved.

Although, in the foregoing description, the invention has been described with respect to an apparatus which has two vortex detectors 24 and 26, the concept of the present invention is also applicable to an apparatus which has only one vortex detector.

What is claimed is:
1. A fluid flow rate measuring apparatus, comprising:
   a conduit in which a fluid to be measured flows in a given direction;
   a vortex generator arranged in said conduit to produce vortexes upon flowing of the fluid;
   two terminal rod members of electrically conductive resilient material, each being fixed to laterally opposed side wall sections of said conduit downstream of said vortex generator, each terminal rod member having a straight section which extends along the conduit;

a vortex detector for detecting the vortexes produced by said vortex generator, said detector being supported by said terminal rod members by having both ends thereof electrically and mechanically connected to the straight sections of the terminal rod members, respectively;

two connecting wires, each having one end connected to the detector and the other end connected to the straight section of one of said terminal rod members to achieve an additional electrical connection between the detector and the corresponding terminal rod member in addition to the direct connection between them; and means for resiliently supporting the straight sections of said terminal rod members, the ends of said detector and said connecting wires relative to said conduit.

2. A fluid flow rate measuring apparatus as claimed in claim 1, in which said means comprises:

two chambers respectively formed in said laterally opposed side wall sections of the conduit in such a manner that the straight sections of the terminal rod members are exposed to the interior of the respective chambers;

two slits respectively formed in said laterally opposed side wall sections of the conduit and extending from the respective chambers to the interior of said conduit for spacedly receiving therein the end portions of said detector; and heat insulating resilient materials packed in said chambers.

3. A fluid flow rate measuring apparatus as claimed in claim 2, in which the straight section of each terminal rod member extends across the corresponding chamber.

4. A fluid flow rate measuring apparatus as claimed in claim 2, in which the straight section of each terminal rod member terminates in the corresponding chamber at a position spaced from the wall of the chamber.

5. A fluid flow rate measuring apparatus as claimed in claim 1, in which each of said terminal rod member has a bent end which is projected outward from the conduit to form a terminal proper to which a lead wire extending from a control circuit is connected.

6. A fluid flow rate measuring apparatus as claimed in claim 5, in which the ends of said detector are connected to the straight sections of the terminal rod members by soldering or welding.

7. A fluid flow rate measuring apparatus as claimed in claim 6, in which said detector is arranged to be perpendicular to the fluid flow in the conduit.

8. A fluid flow rate measuring apparatus as claimed in claim 1, in which said conduit comprises two identical channel members which are combined by joining the tops of their corresponding side wall sections to provide therewithin an enclosed passage.

9. A fluid flow rate measuring apparatus as claimed in claim 8, in which each of the side wall sections of the channel members is formed with a chamber portion, so that, upon assemblage of said two channel members, the chamber portions of the corresponding side wall sections of them are mated with each other to form said chambers.

* * * * *